United States Patent [19]

Mills

[11] E Re. 29,460

[45] Reissued Oct. 25, 1977

[54] PCM TONE RECEIVER USING OPTIMUM STATISTICAL TECHNIQUE

[75] Inventor: Jeffrey P. Mills, Forest Park, Ill.

[73] Assignee: GTE Automatic Electric Laboratories Incorporated, Northlake, Ill.

[21] Appl. No.: 772,391

[22] Filed: Feb. 28, 1977

Related U.S. Patent Documents

Reissue of:

[64] Patent No.: 3,961,167
Issued: June 1, 1976
Appl. No.: 490,450
Filed: July 22, 1974

[51] Int. Cl.[2] ..... G06F 15/36; H04Q 11/00

[52] U.S. Cl. ..... 364/724; 179/15 BY; 325/321

[58] Field of Search ..... 235/152, 150.1, 151.3; 179/15 AP, 15 BY; 178/68, 88; 325/321, 38 R, 38 A, 39, 40; 324/77 B, 77 D

[56] References Cited

U.S. PATENT DOCUMENTS

| | | | |
|---|---|---|---|
| 3,710,028 | 1/1973 | Pitroda | 179/15 BY |
| 3,803,390 | 4/1974 | Schaepman | 235/152 |
| 3,824,471 | 7/1974 | Mills | 325/321 |

OTHER PUBLICATIONS

Modestino & Davisson "Adaptive Detection of Weak Signals in Statistically Undefined Noise Backgrounds." Symposium on Computer Processing in Communications Polytechnic Institute of Brooklyn, Apr. 8-10, 1969, pp. 629-651.

*Primary Examiner*—David H. Malzahn

[57] ABSTRACT

This invention relates to signal detecting and in particular to apparatus and a method for detecting one or more audio frequencies (tones) contained in a Pulse-Coded Modulation (PCM) signal.

8 Claims, 6 Drawing Figures

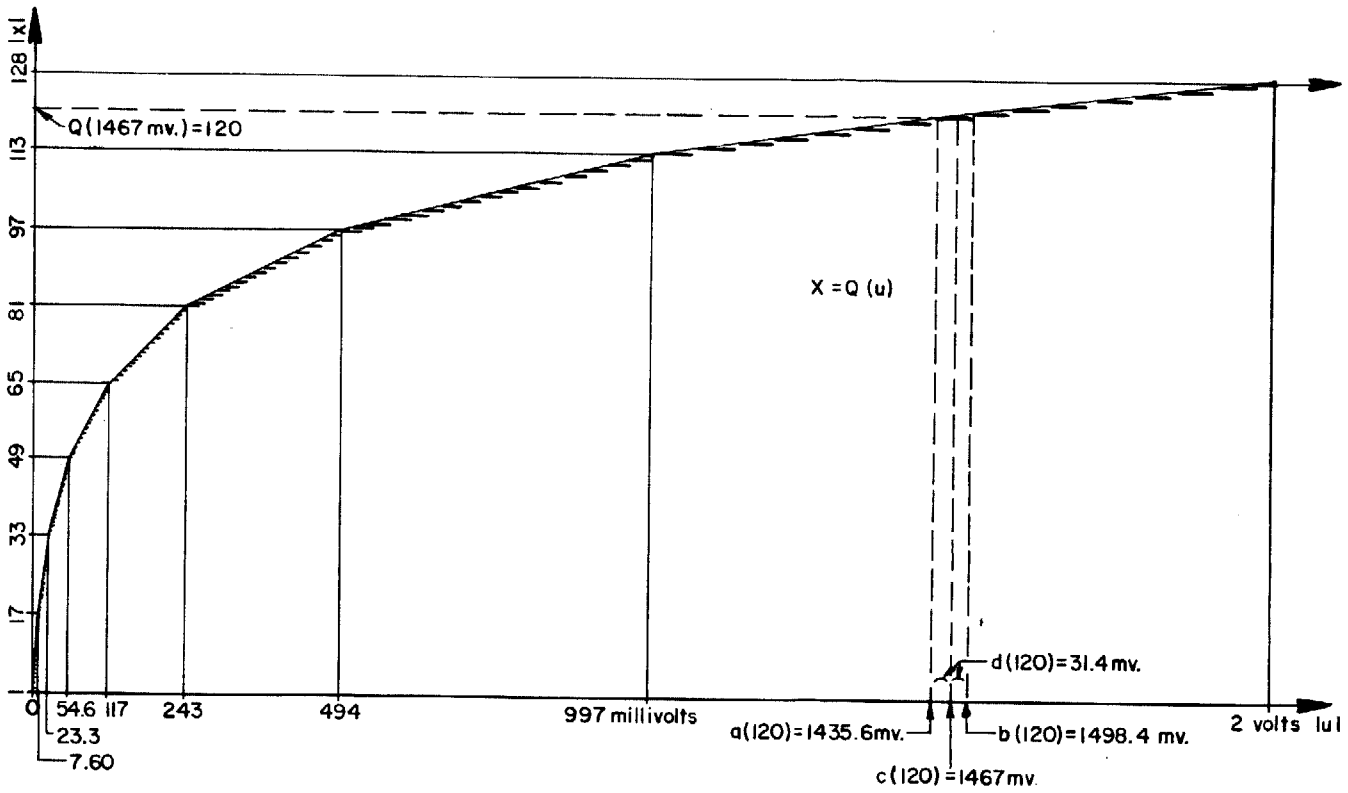
FIG.6 TYPICAL QUANTIZING FUNCTION, Q

PCM TONE RECEIVER USING OPTIMUM STATISTICAL TECHNIQUE

Matter enclosed in heavy brackets [ ] appears in the original patent but forms no part of this reissue specification; matter printed in italics indicates the additions made by reissue.

BACKGROUND OF THE INVENTION

Reference may be made to the following U.S. Pat. Nos.: 2,902,542; 3,432,619; 3,435,147; 3,544,723; 3,548,107 and 3,632,888.

Pulse-Coded Modulation (PCM) is a system of audio frequency transmission whereby the continuously varying (analog) audio signal is coded into a series of digital binary pulses, transmitted over a distance, and then converted back to analog. The signal, while in digital form, may be transmitted over very large distances. Any distortion or attenuation introduced by the transmission medium can be corrected for at strategic points ("repeaters") since the full amount of information can be recovered from the digital pulse-coded signal at each repeater. Furthermore, many audio signals can be combined onto one PCM line, and later separated, so that the line can transmit many conversations. This multiplexing is achieved by sequentially transmitting one pulse from each conversation onto the line, and, at the receiving end of the line, using a demultiplexer to divert each pulse to the correct converter, each of which then converts the pulses of one conversation back to the conventional analog form. The principle is described in various publications, and reference may be made for instance to "An Introduction to PCM Switching", Automatic Electric Technical Journal, Apr. 1971.

Control signal information, such as the number being called, etc., is conveyed over conventional telephone lines by audio-frequency tones, such as the Touch Calling Multifrequency (TCMF) and the Two-Out-of-Six Multifrequency (2/6 MF) schemes. In these schemes two audio frequencies are generated by oscillators and applied to the conventional telephone line, and filters are used at the receiving end to detect the presence of these control signal tones and cause the system to operate accordingly.

Although many different schemes could be used to transmit the control signal information over PCM lines, it is desired, for compatibility reasons, to inject the same tones into the analog circuitry and code them, like any other audio signal, such as voice signals, into the PCM format. Then, at the receiving end, the demultiplexer could convert this pulse-coded tone back to analog, and the presence of the tones may be detected, as with conventional telephone lines, by filters, as set forth for example in U.S. Pat. No. 3,544,723. This patent also suggests the detection of a PCM tone signal by comparing an incoming signal to its delayed derivative, the detection being effected in the PCM domain.

Improved method and apparatus for detecting one or more tones in a PCM signal are disclosed in applicant's copending applications, Ser. No. 309,020, filed Nov. 24, 1972, now U.S. Pat. No. 3,863,030; and Ser. No. 311,064, filed Dec. 1, 1972, now U.S. Pat. No. 3,824,471, and assigned to the same assignee here. Those applications use digital Fourier spectrum analysis and describe two different techniques for implementation.

SUMMARY OF THE INVENTION

Accordingly it is a principal object of the present invention to provide a novel PCM receiver combination and method for detecting a PCM tone signal utilizing logic circuits without the necessity of converting the PCM signal to analog and then filtering it, without the necessity for deriving the derivative of the PCM signal, and with a lower error rate than that obtainable using Fourier spectrum analysis. The detector monitors the incoming PCM signal to determine the presence of a valid combination consisting of any two of the six frequencies used for control. It determines the tone combination (or absence of tones) which would most liekly cause the sequence of samples being observed. This process constitutes statistical detection, which is a well-known process. The application of the process to this problem is discussed in my paper entitled "Statistical Detection of Quantized Audio Tones", Proceedings of the National Electronics Conference, vol. 28, 1973.

The apparatus required for the detection technique described herein is somewhat more complex than that described in either of my above mentioned applications. Therefore, this technique is best suited for applications where the errors introduced by the previously described techniques, although small, are unacceptable. However, as more large scientific computers are produced, the component circuits may become readily available in large-scale monolithic form. Then, the present invention may be preferable over those described in the aforementioned applications even when the reduced error rate is not required.

In one embodiment of the invention, a multiplicity of N samples from the PCM signal are observed and are designated by an N-dimensional vector, x. Typically, 10 samples are observed, i.e., $N = 10$. The audio signal which was encoded to obtain these samples may or may not contain a pair of MF tones, and there are several combinations of MF tones which the signal could contain. The combination of MF tones is designated $\beta$, which may be equal to 1, 2, etc., or 0 if no tones are present at all. Depending on the PCM samples x, it is possible to estimate which combination of MF tones $\beta$ was probably transmitted. Specifically, for each possible combination of MF tones $\beta$, the probability that the sequence of samples x would result is calculated. This probability is designated $P_{x|\beta}$. The combination $\beta$ for which $P_{x|\beta}$ is highest is then deemed to be the combination of MF tones which is present. If $\beta$ is deemed to be 0, then this is equivalent to deciding that no MF tones are present at all.

Other objects will appear from time to time in the ensuing specification, drawings, and claims.

BRIEF DESCRIPTION OF THE DRAWINGS

FIG. 6 is a graphic representation of a quantizing function useful in describing the method of the present invention.

DESCRIPTION OF THE PREFERRED EMBODIMENT

Figure 1:
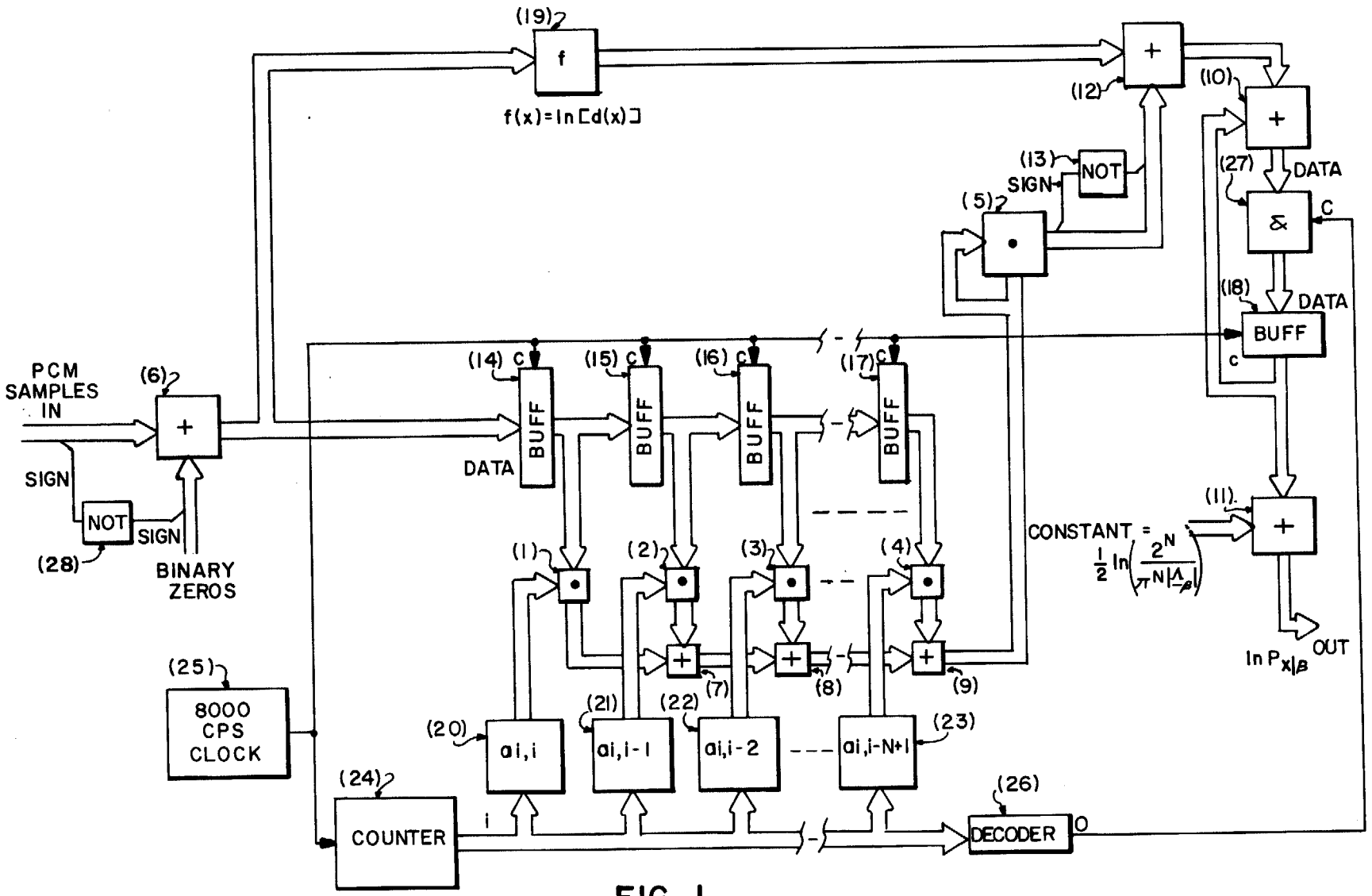
FIG. 1 is a block diagram representation of the PCM tone receiver of the present invention.

The essence of my invention is a device which calculates the probability $P_{x|\beta}$ defined above. The theory behind this calculation is fully justified in my dissertation, entitled Statistical Detection of Quantized Audio Tones, Illinois Institute of Technology, Chicago, 1973. The process will be described here.

Corresponding to each possible combination of MF tones, (including the special case of no tones at all, or $\beta = 0$), there exists a unique covariance matrix, which is designated $\underline{\Lambda}_\beta$. If the number of PC samples to be observed is designated N, then $\underline{\Lambda}_\beta$ is a positive-definite, symmetric $N \times N$ matrix. The actual values of the numbers contained in the matrix depend on the tone frequencies being sought, as well as their strength and tolerance and the amount of background noise. The numbers must be calculated, for each possible pair of tones, by the method described below.

A tone generated by an oscillator will vary slightly in amplitude and frequency and therefore constitutes a stochastic process. A stochastic process will first be defined corresponding to each single tone, and, by summing the two appropriate processes, it will then be possible to define a stochastic process corresponding to each possible combination, $\beta$.

The output of a sinewave oscillator is a stochastic process given by:

$$u(t) = V\cos(\omega t + \phi) \tag{1}$$

where t represents time and where V, $\omega$, and $\phi$ are random variables representing peak amplitude, angular velocity ($2\pi$-frequency), and phase, respectively. The process must be stationary, since the time origin is unknown and therefore cannot affect the process. Therefore, the phase must be uniformly distributed, or:

$$P_3(\phi) = \tfrac{1}{2}\pi \text{ for } 0 \leqq \phi < 2\pi \tag{2}$$

System specifications state that the frequency of an audio signaling tone must be held within a certain range centered about the nominal frequency, but nothing is usually specified regarding the probability density of the frequency within its permissible limits. For the purpose of this analysis, the frequency is assumed to have a normal probability density function with its mean equal to the given nominal frequency, $f_0$, and with its standard deviation equal to one third of the specified frequency tolerance, $\Delta f$. Then the conditional probability density of give $f_0$ is given by:

$$P_2(\omega|f_0) = \frac{\exp[(\omega - \omega_0)^2/2\sigma_2^2]}{\sqrt{2\pi}\ \sigma_2} \tag{3}$$

where $\omega_0 = 2\pi f_0$ and $\sigma_2 = 2\pi\Delta f/3$.

System specifications state $V_{max}$ and $V_{min}$, the tolerance limits of the tone amplitude, but, again, nothing is usually known about the probability density function of the amplitude between these limits. In this case it is most reasonable to assume that the logarithm of the amplitude is normally distributed between the limits. The resulting amplitude probability density function is the logarithmico-normal function:

$$P_1(V) = \frac{\exp[-\ln^2(V/\sqrt{V_{max}V_{min}})/2\sigma_1^2]}{\sqrt{2\pi\sigma_1 V}} \text{ for } V > 0 \tag{4}$$

where $\sigma_1 = (1/6)\ln(V_{max}/V_{min})$. Furthermore, it is assumed that $\phi$, $\omega$, and V are all statistically independent.

The stochastic process, u(t), consisting of a single, undistorted audio tone, with random amplitude, frequency, and phase, is completely defined by Eqs. (1) through (4). Except for the small probability that one of the normally-distributed random variables exceeds three times its standard deviation, this definition is consistent with the system specifications.

It may be shown by one skilled in the art that the mean of u(t) is zero and that its autocorrelation function, which depends on the nominal tone frequency, $f_0$, is given by:

$$R_{f_0}(\tau) = \sigma_u^2 \exp\left[\frac{-(2\pi\Delta f\tau)^2}{18}\right]\cos(2\pi f_0\tau) \tag{5}$$

where:

$$\sigma_u^2 = \frac{1}{2}V_{max}V_{min}\exp\left[\frac{\ln^2(V_{max}/V_{min})}{18}\right] \tag{6}$$

The quantity $\sigma_u^2$ is equal to $R_{f_0}(0)$ and therefore represents the average total power present in u(t).

Equation (5) states the autocorrelation function of u(t) in terms of $V_{max}$, $V_{min}$, $f_0$, and $\Delta f$, all of which are explicitly specified for a particular tone in a given system. When numerical values are substituted for these quantities, a well-defined function, $R_{f_0}(\tau)$ results.

A new process, designated $\hat{u}(t)$, is now defined to be an ergodic Gaussian process with its mean equal to zero and its autocorrelation function equal to $R_{f_0}=\tau)$ given by Eq. (5). Thus, the mean and autocorrelation function of $\hat{u}(t)$ are identical to those of $\hat{u}(t)$. the sample functions of the two processes may be shown to be similar, although not identical. For the purposes of this invention, the Gaussian process $\hat{u}(t)$ is used to represent $\hat{u}(t)$. With this approximation, computation is greatly simplified.

Now consider the sum of two such processes designated $\hat{u}_1(t)$ and $\hat{u}_2(t)$. Their cross-correlation functions are identically zero; therefore, the processes are uncorrelated, or linearly independent. Thus, the autocorrelation function of their sum is equal to the sum of their autocorrelation functions.

Let $\hat{u}_1(t)$ and $\hat{u}_2(t)$ represent the Gaussian approximations of $\hat{u}_1(t)$ and $\hat{u}_2(t)$, respectively. In order that the autocorrelation function of $\hat{u}_1(t) + \hat{u}_2(t)$ be identical to that of $\hat{u}_1(t) + \hat{u}_2(t)$, $\hat{u}_1(t)$ and $\hat{u}_2(t)$ must be uncorrelated. Therefore, in order to achieve a sum process which is Gaussian, $\hat{u}_1(t)$ and $\hat{u}_2(t)$ must be statistically independent, and any possible interdependence between $\hat{u}_1(t)$ and $\hat{u}_2(t)$ must be ignored in the Gaussian approximation. This does not significantly reduce the optimality of the detector.

The generated audio tones pass through various sources of additive noise before being applied to the input of the PCM encoder. System specifications stipulate that the detector must operate under the assumption that the additive noise is Gaussian, band-limited white noise with specified power and bandwidth. This noise will therefore be added to the tones present in each message, and it represents only channel noise applied before the signal is encoded into PCM format. It does not include quantizing noise, which will be discussed later.

If n(t) is a stationary band-limited white Gaussian process, its autocorrelation function is given by:

$$R_n(\tau) = (\sigma_n^2/2\pi f_2\tau)\sin(2\pi f_2\tau) \quad (7)$$

where $\sigma_n^2$ is the noise power, $f_2$ is the upper cut-off frequency, and the lower cut-off frequency is zero. Since the noise process is Gaussian, it is completely specified by Eq. (7).

Let $\hat{u}(t)$ represent any stationary Gaussian random process, and let it be sequentially sampled N times with a period designated T. The amplitude of $\hat{u}(t)$ at each respective instant of sampling will then be $\hat{u}(t_0)$, $\hat{u}(t_0+T)$, $\hat{u}(t_0+2T)$, $\hat{u}(t_0+3T)$, . . . , $\hat{u}(t_0+(N-1)T)$, where $t_0$ is an arbitrary time origin. Let u be an N-element column vector representing these amplitudes. Then, since $\hat{u}(t)$ is Gaussian, the joint probability density function of all elements of u is Gaussian and is therefore given by:

$$P_u(\underline{u}) = (1/\sqrt{|2\pi\underline{\Lambda}|})\exp(-\tfrac{1}{2}\underline{u}'\underline{\Lambda}^{-1}\underline{u}) \quad (8)$$

where $\Lambda$ is the convariance matrix of u, and where $u'$ represents the transpose of u. Each element of $\Lambda$ is given by:

$$\lambda_{ij} = R[(j-i)T] \quad (9)$$

where R represents the autocorrelation function of the stationary process $\hat{u}(t)$.

If $\hat{u}(t)$ approximates a single audio tone, then its autocorrelation function is given by Eq. (5); its covariance matrix, $\Lambda_{f_0}$, may be obtained by evaluating $R_{f_0}(\tau)$ at $\tau=0$, $\tau=T$, $\tau=2T$, etc. On the other hand, if $\hat{u}(t)$ is band-limited white Gaussian noise, then its autocorrelation function is given by Eq. (7). In the physical systems discussed herein, the upper cut-off frequency of the system, $f_2$, is equal to one half the sampling rate. Symbolically:

$$f_2 = 1/(2T) \quad (10)$$

Then, by Eq. (7):

$$R_n(kT) = 0 \text{ for } k \neq 0,\ R_n(0)\ 32\ \sigma_n^2 \quad (11)$$

and therefore:

$$\Lambda_n = \sigma_n^2 I \quad (12)$$

where I is the identity matrix. Finally, if $\hat{u}(t)$ is a combination of these processes representing a messsage, $\beta$, then its covariance matrix, $\underline{\Lambda}_\beta$, is equal to the sum of the covariance matrices of the individual processes, each obtained as above. The joint probability density function of the amplitudes of all samples, u, resulting from the tone combination $\beta$, is then given by:

$$P_{u\,\beta}(u|\beta) = (1/\sqrt{|2\pi\Lambda_\beta|})\exp(-\tfrac{1}{2}u\Lambda_\beta^{-1}\underline{u}) \quad (13)$$

This probability density function is the basis of the detection scheme used in this invention.

A pulse-modulated signal is quantized in order that it may be encoded into binary form. Quantization may be regarded as a function, designated Q. It is a step function possibly with varying step sizes, such as shown for a D-2 channel quantizer in FIG. 6. The independent variable, u, is a continuous variable which represents the quantizer input voltage, and the dependent variable, x, is a discrete number which specifies the appropriate quantizing level on the graph. Only the magnitudes of u and x are shown; it is understood that their signs are identical.

To define the function, Q, it is only necessary to tabulate the lower end point a(x) and the upper end point b(x) for each segment x. Alternatively, the midpoint c(x) may be tabulated, along with d(x), the distance from the midpoint to either end of segment x. These quantities are illustrated for x = +120 in FIG. 6. The table is not included here but it may easily be derived from the compatibility specification for the system under consideration. Functions a and b are related to c and d as follows:

$$a(x) = c(x) - d(x)$$
$$b(x) = c(x) + d(x) \quad (14)$$

These functions will be subsequently utilized to derive the joint probability distribution of the output of the quantizer.

Let a sample $u_k$ be applied to the input of the quantizer defined above. The output of the quantizer, designated $x_k$, will then be $Q(u_k)$, where Q represents the quantizing function. If each of the N samples is sequentially applied to the quantizer, then the N consecutive outputs, designated by the vector x, will be given by:

$$x = Q(u) \quad (15)$$

A particular value of x occurs if and only if the following inequality is safisfied for every sample:

$$a(x_k) \leqq u_k < b(x_k) \quad (16)$$

where a and b are the end-point functions defined.

Let the variables $u_1$ through $u_N$ define the coordinates of a point in an N-dimensional Euclidean space. Then Eq. (16) is satisfied for every sample if and only if the point lies within the region bounded by the hyperplanes $u_1 = a(x_1)$, $u_2 = a(x_2)$, . . . , $u_N = a(x_N)$, and the hyperplanes $u_1 = b(x_1)$, $u_2 = b(x_2)$, . . . , $u_N = b(x_N)$. This region, designated $\Omega(X)$, is a rectangular hypersolid; its position and size depend on x.

The conditional distribution of x given $\beta$ is therefore given by:

$$P_{x|\beta} = \int_{\Omega(\underline{x})} P_{u|\beta}(\underline{u}|\beta)d\underline{u} \quad (17)$$

where $P_{u|\beta}(\underline{u}|\beta)$ is given by Eq. (13) which, when substituted into Eq. (17), yields:

$$P_{x|\beta}\int_{\Omega(\omega)}(1/\sqrt{|2\pi\Lambda_\beta|})\exp(-\tfrac{1}{2}\underline{u}'\underline{\Lambda}_\beta^{-1}\underline{u})d\underline{u} \quad (18)$$

where $\underline{\Lambda}_\beta$ is the covariance matrix corresponding to the message $\beta$.

A multi-dimensional hypervolume integral may be calculated approximately by multiplying the hypervolume of the region of integration by the value of the integrand at the center of the region. The hypervolume of region $\Omega(x)$ is equal to the product of all of its dimensions, which is expressed as $$\prod_{i=1}^{N} [2\,d(x_i)]$$

since each i-th dimension is equal to $2d(x_i)$. The value of u at the center of $\Omega(x)$ is equal to c(x), which is a vector containing $c(x_1), c(x_2), \ldots, c(x_N)$. Therefore:

$$P_{x|\beta} \approx \left[\prod_{i=1}^{N} d(x)\right](2^N/\sqrt{|2\pi\Lambda_\beta|}) \exp[-\tfrac{1}{2} C(x)' \Lambda_\beta^{-1} c(x)]$$

This expression yields an acceptable approximation to $P_{x|\beta}$, and will henceforth be assumed to be equal to $P_x|_\beta$ for practical purposes.

Since $\underline{\Lambda}_\beta$ is positive definite, there must exist a lower triangular matrix, $\underline{A}_\beta$, such that $(\underline{A}_\beta)^t \cdot (\underline{A}_\beta) = \frac{1}{2}\underline{\Lambda}_\beta^{-1}$, where $(\underline{A}_\beta)^t$ represents the transpose of the matrix $\underline{A}_\beta$, $\underline{\Lambda}_\beta^{-1}$ represents the inverse of matrix $\Lambda_{62}$, and where · represents conventional matrix multiplication. The numbers contained in matrix $\underline{A}_\beta$ may be calculated from those contained in matrix $\underline{\Lambda}_\beta$ by a well-known technique known as triangular decomposition.

For each pair of MF tones, $\beta$, therefore, the numbers contained in matrix $\underline{\Lambda}_\beta$ and those contained in matrix $\underline{A}_\beta$ may be calculated by known techniques. These numbers are constants for each possible pair of MF tones $\beta$ and are stored in certain read-only memories contained in the apparatus to be subsequently described.

The apparatus to be described is entirely digital. Where analog quantities must be represented, the quantities are expressed as 8-bit floating-point binary numbers. The convention used in my invention is such that any [floatingpoint] *floating-point* number contains a 1-bit sign, s, a three-bit exponent, c, and a 4-bit fraction, m. The 8-bit floating-point number is organized thus:

$$s\ c_1\ c_2\ c_3\ m_1\ m_2\ m_3\ m_4$$

where each letter represents 1 binary bit which may be either zero (0) or one (1). Thus, the range of C is from zero 000 to seven (111). The number m is assumed to have a binary point immediately to the left of $m_1$, therefore its value may range from zero (0.0000) to 15/16 (0.1111). If S = 0, the [floatingpoint] *floating-point* number is positive, whereas if S = 1 then the number is negative. With these conventions, the value, V, of the [floatingpoint] *floating-point* number represented by these bits is defined to be:

$$V = (1-2s) \cdot (1+m) \cdot 2^c/256$$

Therefore this convention may be used to approximately represent any positive or negative quantity whose magnitude is between zero (which is represented by 00000000 or 10000000) and one (which is represented by 01111111 if positive, or 11111111 if negative). Several of the quantities to be represented (probabilities, for example) have precisely this range. If the quantity being represented has a different range, then a scale factor, $V_0$, will be included which is equal to the maximum possible value of the quantity being represented. Thus:

$$V = V_0 \cdot (1-2s) \cdot (1+m) \cdot 2^c/256$$

In particular, the instantaneous voltage of the analog signal is represented in this manner when encoded into a PCM sample (except for a small displacement discussed later). Typically, the range of the analog signal coltage is from 0 volts to ±2 volts. Therefore, the instantaneous voltage is properly represented if a scale factor of 2 volts is assumed, i.e., $V_0 = 2$ volts.

A block diagram of the preferred embodiment of my invention is shown in FIG. 1. Each interconnection which is represented by a heavy (double) line consists of eight leads which convey a floating-point binary number as defined above. An interconnection represented by a fine (single) line consists of a single lead which conveys 1 binary bit. The function of each block will now be described. For simplicity, the circuitry is shown for N = 4; it may be expanded as shown to provide any value of N.

Figure 2:
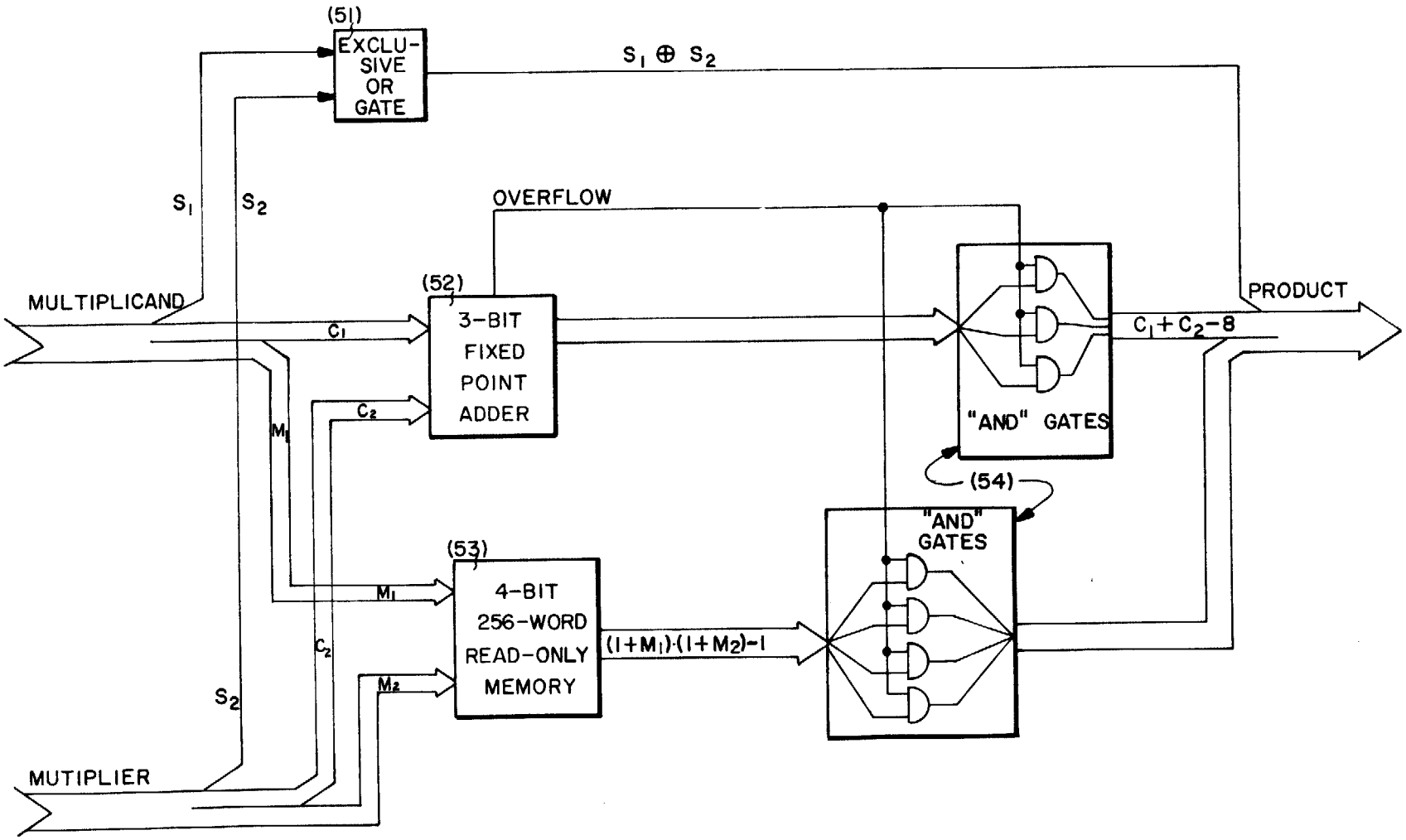
FIG. 2 is a block diagram representation of the floating-point multipliers of FIG. 1.

Blocks 1 through 5 are floating-point multipliers. The floating-point number appearing at the output of each multipler is equal to the product of the floating-point numbers applied to the two inputs of that multiplier. Since [floatingpoint] *floating-point* multiplication is a well-known technique, known circuits may be used here. One such circuit is shown in FIG. 2. The floating-point multiplication algorithm is as follows:

1. The sign of the product is equal to the exclusive-or (⊕) of the signs of the factors, i.e.:

$$S_p = S_1 \oplus S_2$$

2. The exponent of the product is equal to the sum of the exponents of the factors minus eight, i.e.:

$$c_p = c_1 + c_2 - 8$$

The value of eight must be subtracted in order to account for the scaling factor of 256 described earlier.

3. The fraction of the product is related to the fractions of the factors in the following manner:

$$1 + m_p = (1 + m_1)(1 + m_2)$$

or $$m_p = (1 + m_1)(1 + m_2) - 1$$

The operation of FIG. 2 is self-explanatory, with the exception of the function of the AND gates. If $c_1 + c_2$ is eight or greater, an addition overflow occurs, and, if this overflow is ignored, the output of the 3-bit fixed-point adder is equal to $c_1 + c_2 - 8$, as desired. If $c_1 + c_2$ is less than 8, however, no overflow occurs, and, in fact, $c_1 + c_2 - 8$ is negative. Since a negative exponent represents a very small number, the sum is forced to zero by the AND gates in this case. This avoids the necessity of providing for negative exponents. The 256-word read-only memory is addressed by 8 bits — four from each fraction $m_1$ and $m_2$. The word read out from that address is equal to $$(1 + m_1)(1 + m_2) - 1$$

Figure 3:
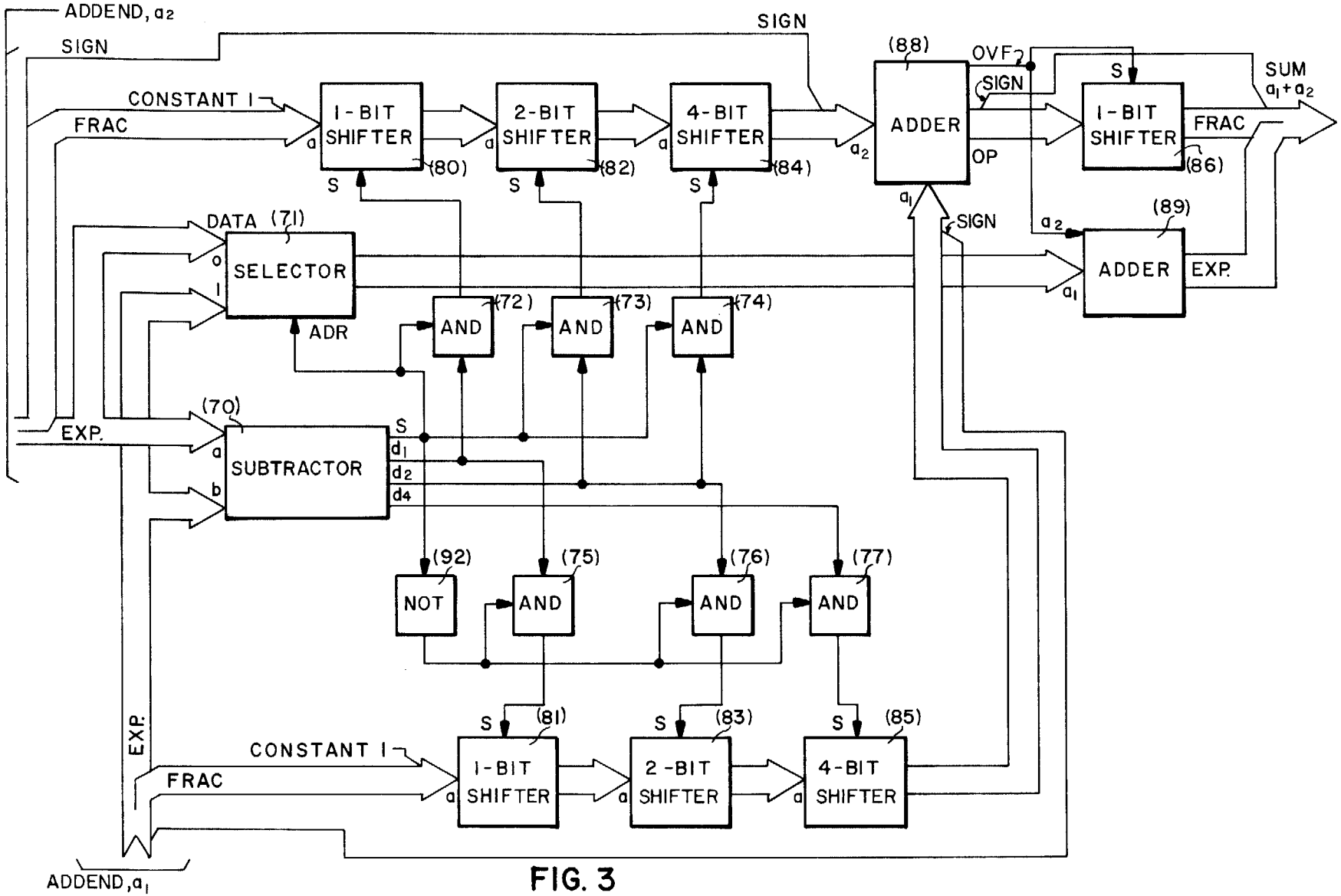
FIG. 3 is a block diagram representation of the floating-point adders of FIG. 1.

Blocks 6 through 12 are floating-point adders. The floating-point number appearing at the output of each adder is equal to the sum of the floating-point numbers applied to the two inputs of that adder. Since floating-point addition is a well-known technique, known circuits may be used here. One such circuit is shown in FIG. 3 and is described as follows.

Subtractor 70 is a four-bit subtractor. Its outputs are defined as follows:

$$s = \begin{cases} 0 \text{ if } a \geqq b \\ 1 \text{ if } a < b \end{cases}$$

$$4 \cdot d_4 - 2 \cdot d_2 + d_1 = a - b$$

where all outputs are 1-bit binary numbers. The outputs thus represent a 5-bit positive or negative binary number in signed magnitude form. This is also a standard logic circuit as used, for instance, in digital computers.

Selector 71 is a data selector, which is also a standard logic circuit as used in digital computers. Its data inputs and output are each three bits. Since it contains two data inputs, its address input requires one bit. When the address input is 0, the data on input 0 is routed through to the output, and when the address input is 1, the data or input 1 is routed through to the output. AND gates 72 through 77 are standard logic circuits wherein an output is 1 if and only if both inputs are 1. Not gate 92 is also a standard logic circuit wherein the output is 1 if and only if the input is 0.

Adder 89 is a fixed-point adder identical to Adder 52 of FIG. 2 except that input $a_2$ is only one bit.

The adder unit 88 is also a fixed-point adder. The inputs and the output are 5-bit signed binary numbers with negative numbers expressed in signed magnitude form. Each 6-bit signed number contains a sign bit and five magnitude bits.

This is also a standard logic circuit.

Shifter circuits 80 through 86 are described as follows. Input a and the output are 5-bit binary numbers. The amount of shift, m, is one for circuits 80, 81 and 86; two for circuits 82 and 93; and four for circuits 84 and 85. If $a_i$ $o_i$ represent one input bit and one output bit, respectively ($1 \leqq i \leqq 5$), where bit 1 is the left-most bit, and bit 5 is the right-most, the logic of all shifter circuits is as follows, substituting the appropriate number for m as specified above:

| | |
|---|---|
| For $1 \leqq i \leqq m$ | |
| $o_1 = (s \epsilon a_1) \mid s$ | for shifter 86 ($m = 1$) |
| $o_1 = s \epsilon a_1$ | for other shifters |
| For $m < i \leqq 5$: | |
| $o_1 = (s \epsilon a_1) \mid (s \epsilon a_{1-m})$ | for all shifters |

where $\epsilon$ and $\mid$ represent Boolean "AND" and "OR", to distinguish from multiplication or addition. The result is that, if input s is 1, the output is equal to input a shifted m bits to the right, with binary zeros shifted into bits $o_1$ through $o_m$. Shifter 86 provides a special function; namely, it replaces a bit lost due to overflow; therefore, this shifter shifts a binary "one" into bit $o_1$. [In] *If* input s of any shifter is o, its output is equal to input a with no shift or other change whatsoever.

Operation of the floating-point adder is as follows. The entire circuit is combinational; i.e., the floating-point sum of difference appears at its output as soon as the two numbers are applied at the inputs, except for gate delays.

The binary output of subtractor 70 is equal to the difference of the two exponents. Case 1 occurs when the exponent of $a_2$ is greater than or equal to the exponent of $a_1$. Then $s = 0$ and the outputs of AND gates 72, 73, and 74 are 0. Since the coefficient of $a_2$ is equal to its fraction plus one ($1 + m$), a constant 1 must be added to the fraction. The resulting coefficient of $a_2$ is propagated through shifter circuits 80, 82, and 84, with no shifting, to input $a_2$ of adder 88. The address input of selector 71 is also 0, and the exponent of $a_2$ is propagated through selector 71 to input $a_1$ of adder 89.

The magnitude of the difference of the exponents is represented, in binary format, by the three outputs $d_1$ through $d_7$, of subtractor 70. Since output s is 0, the output of Not gate 92 is 1. Therefore, the s inputs of shifters 81, 83, and 85 will be equal to the outputs $d_1$, $d_2$, and $d_4$, respectively, of subtractor 70. The coefficient of $a_1$ (i.e., its fraction plus 1) is applied to shifter 81, which will shift it one bit if $d_1 = 1$. The result is applied to shifter 83 which in turn will shift it two more bits if $d_2 = 1$, and so forth. The total number of shifted positions will be equal to the binary number represented by $d_1$, $d_2$, and $d_4$ which is equal to the difference of the two exponents. The shifted coefficient is then in the correct position to be applied to input $a_1$ of adder 88.

The output of adder 88 is the sum of the coefficient of $a_2$ and the shifted coefficient of $a_1$. According to the well-known floating-point addition algorithm, this sum will represent the coefficient of the floating-point sum.

Case 2 occurs when the exponent of $a_1$ is greater than the exponent of $a_2$. Then $s = 1$, the exponent of $a_1$ is propagated through selector 71, and the coefficient of $a_2$ is shifted by an amount equal to the difference between $a_1$ and $a_2$ in the same manner as the coefficient of $a_1$ was shifted in case 1. The output of adder 88 is, as with case 1, the coefficient of the sum of $a_1$ and $a_2$.

When the addition or subtraction within adder 88 causes an overflow, i.e., when the sum or difference would require 6 magnitude bits, output ovf is 1. The coefficient of the sum or difference is shifted one bit to the right by shifter 87, which also shifts the lost bit back into the coefficient, as previously described. Adder 89 adds 1 to the exponent to correct for this shift. On the other hand, if no overflow occurs, the coefficient and exponent are propagated through shifter 87 and adder 89, respectively, with no change. The output is, in all cases, the floating-point representation of the sum of $a_1$ and $a_2$. The uppermost bit of the coefficient is ignored, and the remaining 4 bits comprise the fraction.

Blocks 13 and 28 are NOT gates, or inverters. These are well-known digital logic circuits.

Blocks 14 through 18 are four-bit buffers, or D-registers. When the C input changes from a logic 0 to a logic 1, the 4-bit binary number applied to the data input will appear at the [otput] *output* of the respective buffer. At all other times the output will retain its previous value regardless of the state of the data input. This is a standard logic circuit.

Block 19 is a 256-word, 8-bit read-only memory which is used as a function generator to generate the function f. The contents of the memory are fixed at the time of manufacture. The contents of each word are related to its address in the following manner. The 8-bit address applied to the memory is designated x and is actually a floating-point binary number whose value is designated c(x). Let d(x) represent the difference between this value, c(x), and the next larger value which may be represented by the type of floating-point number used here. Thus, d(x) is a measure of the precision of the value c(x). The contents of the read-only memory location at each address x is made equal to the floating-point representation of the natural logarithm of the difference, d(x). Thus, for any binary number x applied to the memory, where x represents the quantity c(x), the output of the memory will represent the quantity 1 n[d(x)].

Blocks 20 through 23 are N-word, 8-bit read-only memories, where N is the number of observed PCM samples as defined previously. In this case, the address is a [fixedpoint] *fixed-point* binary number, i, which may range from 1 to N. Word i of memory 20 contains the floating-point representation of the number $a_{ii}$, which is the number contained in the i-th row and the i-th column of matrix $\underline{A}_\beta$, defined earlier. Word 1 of memory 21 contains zero, and for $i > 1$, word i contains the number $a_{i,\,i-1}$ which is the number contained in the i-th row and the (i−1)-th column of matrix $A_\beta$. Words 1 and 2 of memory 22 contain zero, and for i>2, word i contains the number $a_{i,\,i-2}$, which is the number contained in the i-th row and the (i−2)-th column of matrix $A_\beta$. The contents of the remaining memories up to 23 follow the same pattern; the first k−1 words of the k-th memory contain zero, and for i>k−1, word i contains $a_{i,\,i-k-1}$. As stated earlier, the matrix $A_\beta$ (and therefore the numbers $a_{ii}$, etc.) are determined by known mathematical techniques from the covariance matrix $\Lambda_\beta$, which is, in turn, determined from information known about the MF tones being sought. The numbers $a_{ii}$, etc., are different for each pair of MF tones being sought, i.e., for each value of $\beta$.

Block 24 is a modulo-N-binary counter. Each time its input is changed from 0 to 1, its output changes to the next higher binary number, until the number N is reached at which time it returns to zero. This is a well-known logic circuit.

Block 25 is an autonomous clock circuit which generates alternate 1's and 0's at its output at a rate corresponding to the rate of the observed PCM samples which in this case is 8 kilohertz, i.e., 8000 logic 1's and 8000 logic 0's per second.

Block 26 is a decoder circuit. Its output is a logic zero if and only if the binary number applied to its input is zero. This is a well-known logic circuit.

Block 27 is a multiple AND gate (the symbol & is used to distinguish it from multiplication). When input C is a logic 1 the binary number at its output equals that at its DATA input, otherwise the output is zero. This is also a well-known logic circuit.

Operation of the detector is as follows, referring to FIG. 1. A sequence of N samples from the PCM signal is applied at the point labelled PCM Samples In. If each sample is regarded as a floating-point number, then its value, V, is equal to:

$$V = (1 - 2s) \cdot (1 + m) \cdot 2^c/256$$

where s, m, and c are certain bits in the sample as defined previously. However, the amplitude of the analog signal, $V_a$, which was encoded to obtain this sample, is:

$$V_a = V_o - (1 - 2s) \cdot [(1 + m) \cdot 2^c - 1]/256$$

where $V_o$ is the scaling factor described earlier. This correspondence is dictated by the PCM encoding technique, which is well established. To correct for the displacement of −1, a floating-point number is generated whose sign s is opposite to that contained in the PCM sample, and whose fraction m and exponent c are zero. This is achieved by inverting the sign bit via NOT gate 28 and combining it with 7 binary zeros. This number is added, by adder 6, to the incoming PCM sample, and the value represented by the output of the adder, designated c(x), is:

$$c(x) = [(1-2s)\cdot(1+m)\cdot 2^c/256] - [1-s)(1+0)\cdot 2^0/256]$$

or:

$$c(x) = (1-2s)[(1+m)\cdot 2^c - 1]/256$$

Therefore, this value represents the true analog voltage (appropriately scaled) encoded into the PCM sample. This is a combinational (non-time-dependent) process which is repeated on each PCM sample.

As each PCM sample appears at the output of Adder 6, Buffers 14 through 17 are pulsed by clock 25. This causes each sample to be gated into the next buffer (the last sample is lost). Therefore, at any time, the last N samples are stored in these buffers.

Counter 24 advances continuously after being reset. Let i represent the number of PCM samples received since counter 24 was last reset ($0 \leqq i < N$). The value represented by the output of Buffer 14 is $c(x_i)$, and the value represented by the output of Read-only Memory 20 is $a_{ii}$, both of which were defined earlier. These floating-point numbers are multiplied by Multiplier 1, the output of which represents the value $a_{ii}c(x_i)$. Similarly, the output of Buffer 15 represents the value $c(x_{i-1})$, and for i>1, the output of Read-only Memory 21 represents the value $a_{i,\,i-1}$. Therefore, for i>1, the output of Multiplier 2 represents the value $a_{i,\,i-1}c(x_{i-1})$. Similarly, for i>2, the output of Multiplier 3 represents $a_{i,\,i-2}c(x_{i-2})$, and so on up to Multiplier 4. The outputs of these multipliers are added by Adders 7 through 9, and the output of Adder 9, designated $w_i$, is therefore:

$$w_i = \sum_{f=0}^{i-0} a_{i,\,i-1}c(x_{i-1})$$

This quantity is multiplied by itself (squared) by Multiplier 5, and its sign is inverted by NOT gate 13. The quantity applied to the lower input of Adder 12 is therefore $-w_i^2$.

The PCM sample $x_i$ is also applied to Read-only Memory 19, and the output of the latter represents the quantity $\ln[d(x_i)]$, as defined previously. This quantity is applied to the upper input of Adder 12, the output of which is $\ln[d(x_i)] - w^2$. This quantity is added, by Adder 10, to the contents of Buffer 18, which was set to zero by AND gate 27 controlled by decoder 26, when counter 24 was equal to zero, i.e., before the first observed PCM sample. The above quantity is added to the total in Buffer 18 as each PCM sample is processed. Therefore, after N samples are processed, Buffer 18 will contain the quantity Q':

$$Q' = \sum_{i=1}^{N} \{\ln[d(x_i)] - w_i^2\}$$

The following floating-point constant is hard-wired into the lower input of Adder 11:

$$\tfrac{1}{2}\ln[2^N/(\pi^N|\underline{\Lambda}_\beta|)]$$

where $|\underline{\Lambda}_\beta|$ represents the determinant of the covariance matrix $\underline{\Lambda}_\beta$ defined previously. Therefore, the output of Adder 11, designated Q, will be equal to:

$$Q = \tfrac{1}{2}\ln[2^n/(\pi^n|\Lambda_\beta|)] + \sum_{i=1}^{N} \{\ln[d(x_i)] - w_i^2\}$$

This is mathematically equivalent to:

$$Q = \ln\left\{\left[\prod_{i=1}^{N} d(x_i)\right]\sqrt{\frac{2N}{\pi^N|\Lambda_\beta|}}\exp\left(-\sum_{i=1}^{N} w_i^2\right)\right\}$$

Let w be an N-dimensional column vector consisting of the numbers $w_1$ through $w_N$. It is a well-known mathematical fact that:

$$\sum_{i=1}^{N} w_i^2 = (w^t) \cdot (w)$$

where $w^t$ represents the transpose of w and where · represents conventional matrix multiplication. Furthermore, let c(x) be an N-dimensional column vector consisting of the numbers $c(x_1)$ through $c(x_N)$. Then the earlier definition of $w_i$ for all values of i may be written thus $$w = (\underline{A}_\beta) \cdot c(x)$$

where $\underline{A}_\beta$ is as defined earlier (note that $\underline{A}_\beta$ was [chosed] *chosen* to be lower-triangular, i.e., $a_{ik} = 0$ for $k > i$). Therefore:

$$\sum_{i=1}^{N} w_i^2 = (w^t) \cdot (w) = [c(x)]^t \cdot (A_\beta) \cdot [c(x)]$$

and the output of Adder 11 is equal to:

$$Q = \ln\left\{\left[\prod_{i=1}^{N} d(x_i)\right] \sqrt{\frac{2^N}{\pi^N |\underline{A}_\beta|}} \exp\left[-\frac{1}{2} c(x)^t \underline{A}_\beta^{-1} c(x)\right]\right\}$$

As shown in my dissertation, referred to above, the expression within the braces is the expression for the desired probability, $P_x\beta$, therefore;

$$Q = \ln P_x|_\beta.$$

Thus, the output of Adder 11 represents the natural logarithm of the desired probability, $P_x|_\beta$.

FIG. 1 is implemented separately for each possible combination of MF tones, i.e., for each value of $\beta$. Typically, there are 15 possible combinations, plus the additional case of no tones at all ($\beta=0$); therefore, FIG. 1 is repeated 16 times. As stated above, the contents of Read-only Memories 20 through 23 and the constant which is hard-wired into the lower input of Adder 11 are different for each of the sixteen implementations of FIG. 1. These numbers were determined from the covariance matrix $\underline{A}_\beta$ associated with each MF-tone combination, $\beta$, with $\underline{A}_\beta$ calculated as described in my dissertation, as mentioned above.

To determine the most-likely combination of MF tones (the most likely value of $\beta$) which caused the observed sequence of PCM samples, x, it is only necessary tp choose the value of $\beta$ which yields the highest value of $P_x|_\beta$, or, equivalently, the highest value of $\ln P_x|_\beta$. A circuit for this purpose is shown in FIGS. 4 and 5.

Figure 4:
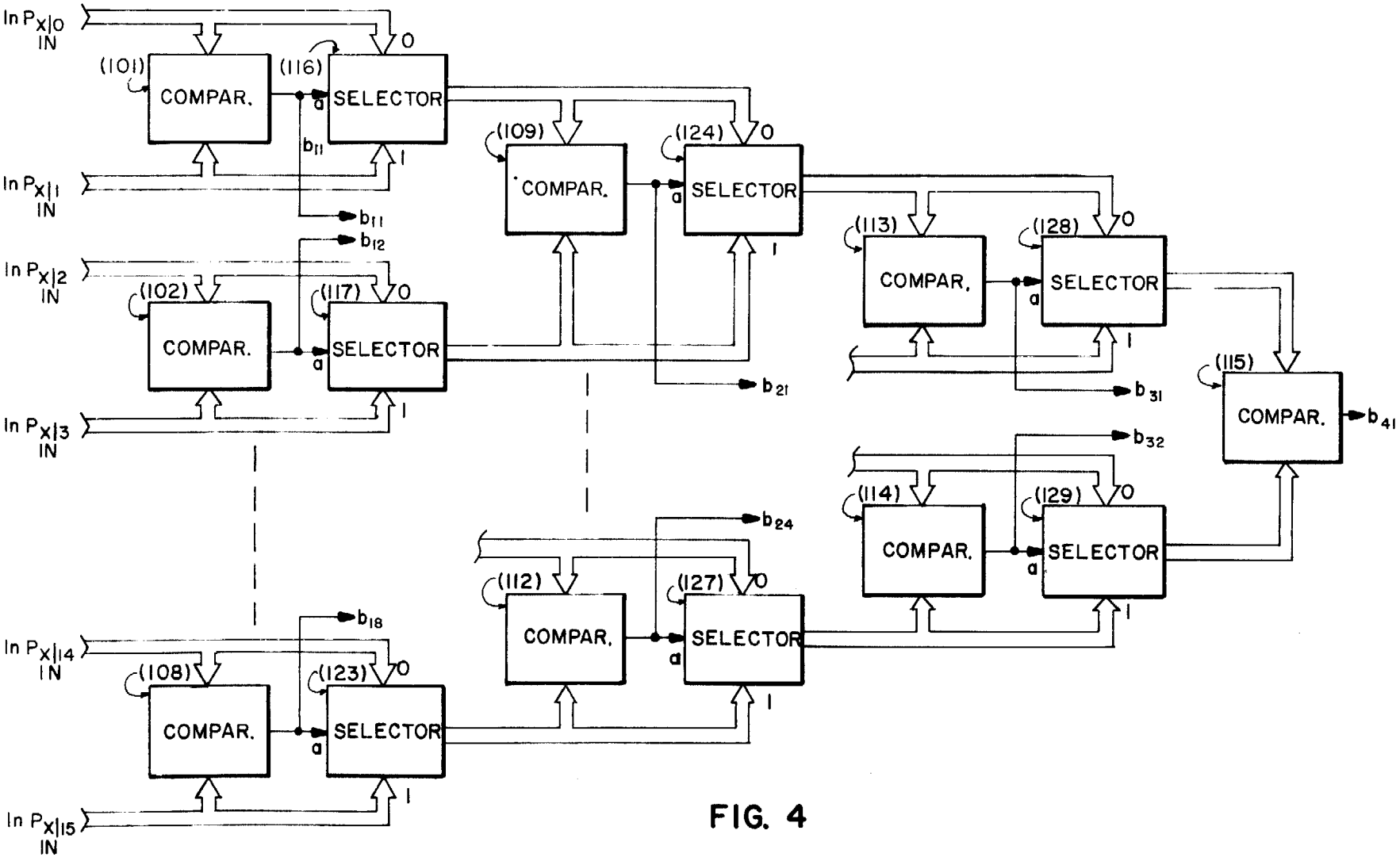
FIGS. 4 and 5 are a block diagram representation of a detector circuit driven by the PCM tone receivers of the type in FIG. 1.
Figure 5:
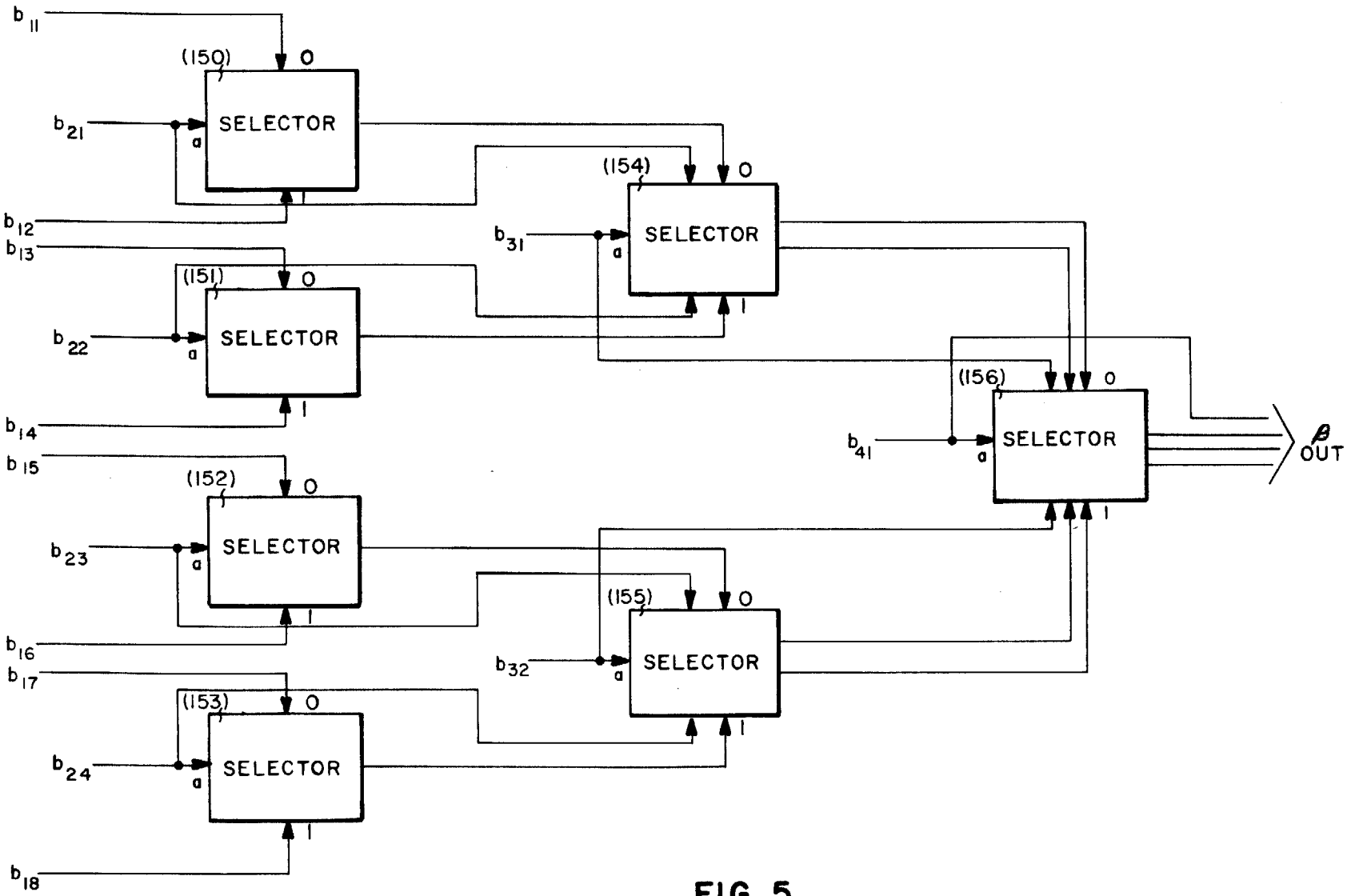

Block 101 [throgh] *through* 115 in FIG. 4 are 8-bit comparator circuits. The output of each such circuit is a logic 1 if and only if the value of 8-bit binary number applied to its lower input exceeds the value of the binary number applied to its upper input. Blocks 116 through 129 in FIG. 4, and blocks 150 through 156 in FIG. 5, are data selectors which are similar to block 71 in FIG. 3. If input a is a logic 0, then the binary bits at the output of a data selector are respectively equal to the bits applied to input 0, whereas if input a is a logic 1, then the output bits are equivalent to those applied to input 1. The data inputs and outputs of Selectors 116 through 129 contain eight bits; Selectors 150 through 153 contain one bit, Selectors 154 and 155 contain 2 bits, and Selector 156 contains three bits. All blocks contained in FIGS. 4 and 5 are well-known logic circuits.

Operation of the circuit is as follows. The outputs of the sixteen implementations of FIG. 1 (for the 16 MF-tone combinations being sought) are applied to the sixteen inputs of FIG. 4 labelled $\ln P_x|_0$ in through $\ln P_x|_{15}$ in. Comparator 101 compares $\ln P_x|_0$ with $\ln P_x|_1$, and its output is applied to Selector 116 which therefore "selects" the larger of these quantities and displays it at its output. Comparators 102 through 108, in conjunction with selectors 117 through 123, repeat this process on the numbers $\ln P_x|_2$ through $\ln P_x|_{15}$, in pairs of two, each selector selecting the larger of the two numbers. The [reslting] *resulting* eight numbers are then compared in pairs of two, in the same manner, by Comparators 109 through 112, and the larger number of each pair is selected by the appropriate Selector in the group 124 through 127. The resulting four numbers are compared, and the larger of each pair selected, by Comparators 113 and 114, and by Selectors 128 and 129. Finally, the resulting two numbers are compared by Comparator 115, and its output determines which is larger.

The information about the relative magnitudes of $\ln P_x|_0$ through $\ln P_x|_{15}$ is contained in the outputs of Comparators 101 through 115. Each such output is applied to the circuit of FIG. 5, which converts these outputs to the binary representation of $\beta$. Its operation is as follows. If the maximum value of $\ln P_x|_\beta$ occurs for $\beta \geqq 8$, then it will be on one of the lower eight inputs of FIG. 4, the number applied to the lower input of Comparator 115 will exceed that applied to the upper input, and its output will be a binary 1. Conversely, if the maximum occurs for $\beta < 8$, then the output of Comparator 115 will be a binary 0. Therefore, this bit constitutes the high-order bit of the desired number, $\beta$. The bit is designated $b_{41}$ in FIGS. 4 and 5. By similar reasoning, it may be shown that the second-highest bit of $\beta$ is equal to $b_{31}$ if $\beta < 8$, or $b_{32}$ if $\beta \geqq 8$. The appropriate bit ($b_{31}$ or $b_{32}$) is therefore selected by Selector 156 according to the state of $b_{41}$. The third-highest bit of $\beta$ is equal to $b_{21}$ if $\beta < 4$, $b_{22}$ if $4 \leqq \beta < 8$, $b_{23}$ if $8 \leqq \beta < 12$, or $b_{24}$ if $\beta \geqq 12$. Therefore, the appropriate one of these bits is selected, by Selectors 154 or 155, and 156, according to the states of $b_{31}$ or $b_{32}$, and $b_{41}$. Finally, the lowest-order bit of $\beta$ is equal to one of the bits $b_{11}$ through $b_{18}$, and is selected, as above, according to the states of bit $b_{21}$ or $b_{22}$ or $b_{23}$ or $b_{24}$, bit $b_{31}$ or $b_{32}$, and bit $b_{41}$. The binary number resulting from these 4 bits constitutes the desired value of $\beta$ which yields the highest value of $\ln P_{x|\beta}$. This completes the detection process.

The case illustrated here assumes that all tone combinations are symmetrical, i.e., that the average usage of all combinations are equal. It is possible, however, that some combinations are used more frequently than others. Then the well-known Bayes rule implies that the likelihood of error is reduced if the heavily-used combinations are weighted more heavily before comparison.

This requires that each probability, $P_x|_\beta$ be multiplied by a constant, designated $P_\beta$, and then the products compared to determine the maximum. Each constant $P_\beta$ is equal to the relative occurrence of the tone combination $\beta$. For example, if $\beta=2$ occurs twice as often as $\beta=3$, then $O_2$ would be twice as large as $P_3$. It is a known fact that this tends to reduce the average error.

The required constant $P_\beta$ is multiplied by $P_x|_\beta$ simply by adding its logarithm to Q, since $\ln(P_{x|\beta} \cdot P_\beta) = q + \ln P_\beta$.

Thus, the weighting factor $\ln P_\beta$ is included simply by hard-wiring a different constant (the old constant increased by $\ln P_\beta$) to the lower input of Adder (11), and the operation of the circuit is unchanged. This constant may also be selected to satisfy other decision rules (such as the Neymann-Pearson rule, which is also well-known).

The component blocks contained in the figures, except where stated otherwise, are well-known circuits and are available in monolithic form. In some cases, multiple blocks may be combined into a single package; in other cases, two or more packages may be required to implement a single block. In all cases, the division of the blocks is functional and the functions are described in various literature.

The following list of standard logic circuits has been found satisfactory in implementing the invention although they should not be interpreted as design limiting or optimum but only as illustrative:

| BLOCK | STANDARD PART DESIGNATION |
|---|---|
| 14, 15, 16, 17 | SN 74198 |
| 18 | SN 74198 |
| 19 | SN 74187 (2) |
| 20, 21, 22, 23 | SN 74187 |
| 24 | SN 74163 |
| 26 | SN 74154 |
| 27 | SN 7408 |
| 28 | SN 7404 |
| 51 | SN 74136 |
| 52 | SN 7483 |
| 53 | SN 74187 |
| 54 | SN 7408 |
| 70 | SN 74181 |
| 71 | SN 74157 |
| 72, 73, 74, 75, 76, 77 | SN 7408 |
| 80, 81, 82, 83, 84, 85, 86 | SN 74157 |
| 88, 89 | SN 7483 |
| 92 | SN 7404 |
| 101, 102, 108, 109, 112, | SN 7485 (2) |
| 113, 114, 115 | SN 7485 (2) |
| 116, 117 | SN 74157 (2) |
| 123, 124, 127, 128, 129 | SN 74157 (2) |
| 150, 151, 152, 153, 154 | SN 7485 |
| 155, 156 | SN 7485 |

Whereas the preferred embodiment of the invention has been shown and described herein, it should be realized that there may be many modifications, substitutions and alterations thereto without departing from the teachings of the invention.

Having described what is new and novel and desired to secure by Letters Patent, which is claimed is:

1. A pulse code modulation (PCM) tone receiver for determining the probability that a particular combination of audio frequencies was transmitted by monitoring PCM samples, said PCM tone receiver comprising:

means for storing N PCM samples as received, where N is an integer, $c_1$ through $c_N$ representing a quantization of the analog voltage waveform sampled;

first means for multiplying said N samples represented by $c_1$ through $c_N$ by a set of fixed predetermined constants $a_{i1}$ through $a_{iN}$, where i is a fixed point binary number ranging from 1 to N and where $a_{i1}$ through $a_{iN}$ are determined from the covariance matrix of the process represented by the particular tone combination to be detected, said first mutliplying means including means for storing said fixed predetermined constants $a_{i1}$ through $a_{iN}$, said first multiplier means operating on said stored output of said storage means;

means for combining said multiplied products of samples $c_1$ through $c_N$ and constants $a_{i1}$ through $a_{iN}$ according to the equation $$w_i = \sum_{k=1}^{i} a_{ik} c_k;$$

means for squaring said resulting combined $w_i$ term;

means for accumulating the resulting $w_i^2$ term as each of said N PCM samples are received;

second means for multiplying said accumulated samples by a [set of] fixed [constants] *constant* related to the covariance matrix with the resulting product representing the probability that the specific combination of audio frequencies was transmitted.

2. The PCM tone receiver as recited in claim 1 further characterized in that said fixed [constants] *constant* in said second multiplier means is modified by a weighting factor based on the average usage of [each] *the particular* tone combination.

3. A pulse code modulation (PCM) tone receiver for determining the probability that a particular combination of audio frequencies was transmitted by monitoring PCM samples, said PCM tone receiver comprising:

means for storing N PCM samples as received, where N is an interger, $c_1$ through $c_N$ representing a quantization of the analog voltage waveform sampled;

first means for multiplying said N samples represented by $c_1$ through $c_N$ by a set of fixed predetermined constants $a_{i1}$ through $a_{iN}$, where i is a fixed point binary number ranging from 1 to N and where $a_{i1}$ through $a_{iN}$ are determined from the covariance matrix of the process represented by the particular tone combination to be detected, said first multiplying means including means for storing said fixed predetermined constants $a_{i1}$ and $a_{iN}$, said first multiplier means operating on said stored output of said storage means;

means for combining said multiplied products of samples $c_1$ through $c_N$ and constants $a_{i1}$ through $a_{iN}$ according to the equation $$w_i = \sum_{k=1}^{i} a_{ik} c_k;$$

means for squaring said resulting combined $w_i$ term:

weighting means for substracting said squared term $w_1^2$ from a weighting factor f(x), said weighting factor determined by the magnitude of the quantizing increment of the PCM quantization process for converting the sampled analog waveform to the received PCM samples;

means for accumulating the resulting $f(x)-w_i^2$ term as each of said N PCM samples are received;

second means for multiplying said accumulated sampls by a [set of] fixed [constants] *constant* related to the covariance matrix with the resulting product representing the probability that the specific combination of audio frequencies was transmitted.

4. A Pulse Code Modulation (PCM) tone receiver apparatus for determining the probability that a particular combination of audio frequencies was transmitted, said tone receiver apparatus comprising:

a plurality of PCM tone receivers, each of said plurality of PCM tone receivers comprises:

means for storing N PCM samples as received, where N is an integer, $c_1$ through $c_N$ representing a quantization of the analog voltage waveform sampled;

first means for multiplying said N samples represented by $c_1$ through $c_N$ by a set of fixed predetermined constants $a_{i1}$ through $a_{iN}$, where i is a fixed point binary number ranging from 1 to N and where $a_{i1}$ through $a_{iN}$ are determined from the covariance matrix of the process represented by the particular tone combination to be detected, said first multiplying means including means for storing said fixed predetermined constants $a_{i1}$ through $a_{iN}$, said first multiplier means operating on said stored output of said storage means;

means for combining said multiplied products of samples $c_1$ through $c_N$ and constants $a_{i1}$ through $a_{iN}$ according to the equation $$w_i = \sum_{k=1}^{i} a_{ik} c_k;$$

means for squaring said resulting combined $w_i$ term;

means for accumulating the resulting $w_i^2$ term as each of said N PCM samples are received; and second means for multiplying said accumulated samples by a [set of] fixed [constants] *constant* related to the covariance matrix with the resulting product representing the probability that the specific combination of audio frequencies was transmitted, each of said plurality of PCM tone receiver detecting the probability that a different particular combination of audio frequencies was transmitted; and combinational means for indicating which one of said plurality of specific tone combinations was most likely transmitted by combining said probability outputs of each of said plurality of PCM tone receivers.

5. The PCM tone receiver apparatus as recited in aim 4 further characterized in that said combinational dicating means includes comparator means for comıring the relative magnitude of said plurality of resulnt probability products.

6. A method for statistically estimating the probability at a specific combination of audio frequencies was ansmitted in a Pulse Code Modulation (PCM) format gnal, comprising the steps of:

storing N samples, where N is an integer, $c_1$ through $c_N$ representing a quantization of the analog voltage waveform sampled;

multiplying said set of N samples represented by $c_1$ through $c_N$ by a set of fixed predetermined constants $a_{i1}$ through $a_{iN}$, where i is a fixed point binary number ranging from 1 to N and where $a_{i1}$ through $a_{iN}$ are determined from the covariance matrix of the process represented by the particular tone combination to be detected and adding the products according to the equation $$w_i = \sum_{k=1}^{i} a_{ik} c_k;$$

squaring the resulting $w_i$ terms;

processing the resulting squared term $w_i^2$ through accumulator means as each sample is received;

multiplying said squared term samples by a [set of] fixed [constants] *constant* related to the covariance matrix with the resulting product representing the probability that the specific combination of audio frequencies was transmitted.

7. A method for statistically estimating the probability that a specific combination of audio frequencies was transmitted in a Pulse Code Modulation (PCM) format signal, comprising the steps of:

storing N samples, where N is an integer, $c_1$ through $c_N$ representing a quantization of the analog voltage waveform sampled;

multiplying said set of N samples represented by $c_1$ through $c_N$ by a set of fixed predetermined constants $a_{i1}$ through $a_{iN}$, where $a_{i1}$ through $a_{iN}$ are determined from the covariance matrix of the process represented by the particular tone combination to be detected and adding the products according to the equation $$w_i = \sum_{k=1}^{i} a_{ik} c_k;$$

squaring the resulting $w_i$ terms;

subtracting the squared term $w_i^2$ from a weighting factor f(x), said weighting factor determined by the magnitude of the quantizing increment of the PCM quantization process converting the sampled analog waveform to the received PCM samples;

processing the resulting squared term $f(x)-w_i^2$ through accumulator means as each sample is received;

multiplying said squared term samples by a [set of] fixed [constants] *constant* related to the covariance matrix with the resulting product representing the probability that the specific combination of audio frequencies was transmitted.

8. A method for statistically determining which specific one of several combinations of audio frequencies was most likely transmitted in a Pulse Code Modulation (PCM) format signal, comprising the steps of:

a. storing N samples, where N is an integer, $c_1$ through $c_N$ representing a quantization of the analog voltage waveform sampled;

b. multiplying said set of N samples represented by $c_1$ through $c_N$ by a set of fixed predetermined constants $a_{i1}$ through $a_{iN}$, where i is a fixed point binary number ranging from 1 to N and where $a_{i1}$ through $a_{iN}$ are determined from the covariance matrix of the process represented by the particular tone combination to be detected and adding the products according to the equation $$w_i = \sum_{k=1}^{i} a_{ik} c_k;$$

c. squaring the resulting $w_i$ terms;

d. processing the resulting squared term $w_i^2$ through accumulator means as each sample is received;

e. multiplying said squared term samples by a [set of] fixed [constants] *constant* related to the covariance matrix with the resulting product representing the probability that the specific combination of audio frequencies was transmitted;

f. repeating steps (a) - (e) for each of said several combinations of audio frequencies to obtain for each a resulting probability product;

g. comparing said plurality of resulting probability products, said comparing step indicating which of said plurality of probability products represented by a binary number is maximum representing which specific one of said several combinations of audio frequencies was most likely transmitted.

* * * * *

UNITED STATES PATENT AND TRADEMARK OFFICE

CERTIFICATE OF CORRECTION

PATENT NO. : Re. 29,460

DATED : October 25, 1977

INVENTOR(S) : Jeffrey P. Mills

It is certified that error appears in the above-identified patent and that said Letters Patent are hereby corrected as shown below:

Column 16, line 38, "and" should read --through--
line 60, "sampls" should read --samples--

Column 17, at the beginning of line 41, add --cl--
at the beginning of line 42, add --in--
at the beginning of line 43, add --pa--
at the beginning of line 44, add --ta--
at the beginning of line 46, add --th--
at the beginning of line 47, add --tr--
at the beginning of line 48, add --si--

Signed and Sealed this

*Twenty-third* Day of *May 1978*

[SEAL]

*Attest:*

RUTH C. MASON
*Attesting Officer*

LUTRELLE F. PARKER
*Acting Commissioner of Patents and Trademarks*